United States Patent [19]

Ujita

[11] 4,319,654
[45] Mar. 16, 1982

[54] TRACTOR STEERING MECHANISM

[75] Inventor: Tuginobu Ujita, Sakai, Japan

[73] Assignee: Kubota, Ltd., Osaka, Japan

[21] Appl. No.: 133,226

[22] Filed: Mar. 24, 1980

[30] Foreign Application Priority Data

Jun. 7, 1979 [JP] Japan ................................ 54-71527

[51] Int. Cl.³ .............................................. B62D 5/06
[52] U.S. Cl. ................................................ 180/155
[58] Field of Search ............... 180/154, 155, 156, 157, 180/158, 160, 900

[56] References Cited

U.S. PATENT DOCUMENTS 3,370,669  2/1968  Franklin ............................ 180/156
3,805,910  4/1974  Hull .................................. 180/156

FOREIGN PATENT DOCUMENTS 1521042  8/1978  United Kingdom ................ 180/156

*Primary Examiner*—John A. Pekar
*Attorney, Agent, or Firm*—Jordan and Hamburg

[57] ABSTRACT

A tractor steering mechanism in which the steering wheels are journalled to the frame and are adapted to be steered by a fluid pressure cylinder. The frame is formed into a box shape. Disposed in the inside space of the box-shape frame is a swing means to operate the steering wheels through the fluid pressure cylinder.

4 Claims, 3 Drawing Figures

4,319,654

TRACTOR STEERING MECHANISM

BACKGROUND OF THE INVENTION

The present invention relates to a tractor steering mechanism in which the steering wheels are journalled to a frame and are adapted to be steered by a fluid pressure cylinder.

Under the frame of a tractor, there have conventionally been disposed a tie rod adapted to steer the steering wheels journalled to the frame and for connecting the steering wheels to each other, a swing means connected to the tie rod, a fluid pressure cylinder adapted to drive the swing means, and others.

While a tractor is generally applied for a variety of work, it often has to travel on a muddy ground. Mud may therefore easily stick to the moving members of the steering mechanism. This presents a defect to possibly provoke a trouble.

Furthermore, since a tractor frame for journalling the steering wheels has been substantially the same as that used for a usual motor vehicle, it has been necessary to make provision such that the tractor frame has strength sufficient to permit the tractor to travel on a rough road.

SUMMARY OF THE INVENTION

It is an object of the present invention to overcome such inconvenience of prior art above-mentioned, and to provide a tractor steering mechanism which may enhance the strength of a frame of journalling the steering wheels and also prevent the sticking of mud to the members adapted to steer the steering wheels.

In order to achieve the objects above-mentioned, the tractor steering mechanism in accordance with the present invention comprises a pair of steering wheels, a tie rod for connecting the steering wheels to each other, a frame for journalling the steering wheels and formed into a box shape, a fluid pressure cylinder attached to the box-shape frame, and a swing means having one end pivoted to the fluid pressure cylinder and the other end pivoted to the tie rod, sais swing means swingingly attached to and disposed within the box-shape frame.

According to the invention, the frame for journalling the steering wheels is formed into a box shape, thereby to enhance the strength of the frame. Furthermore, the inside space of the box-shape frame may be utilized; that is, the swing means is disposed inside the box-shape frame. Such arrangement may prevent the sticking of mud to the pivotally connected portions of the swing means to the tie rod, as well as to the fluid pressure cylinder. This presents an advantage that a steering operation may smoothly be performed all the times.

Other objects and advantages of the present invention will be apparent from the following description.

BRIEF DESCRIPTION OF THE DRAWINGS

The invention will be described by way of example, with reference to the accompanying drawings, in which.

DETAILED DESCRIPTION OF THE PREFERRED EMBODIMENTS

A vertically swinging lift-arm 3 is attached to the rear portion of a travelling vehicle body to which a pair of front wheels 1 and a pair of rear wheels 2 are drivingly journalled, thus forming a riding-type tractor to which a working machine such as a rotary cultivator (not shown) may be connected in a vertically moving manner.

Figure 1:
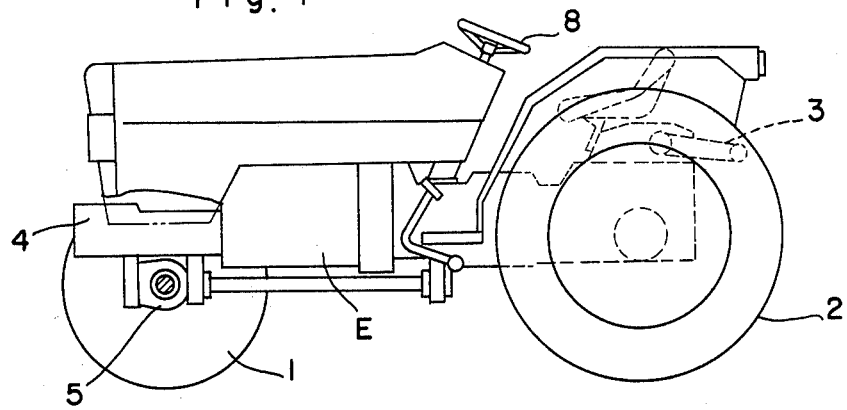
FIG. 1 is a general side view of a riding-type tractor which incorporates a tractor steering mechanism in accordance with the present invention.
Figure 2:
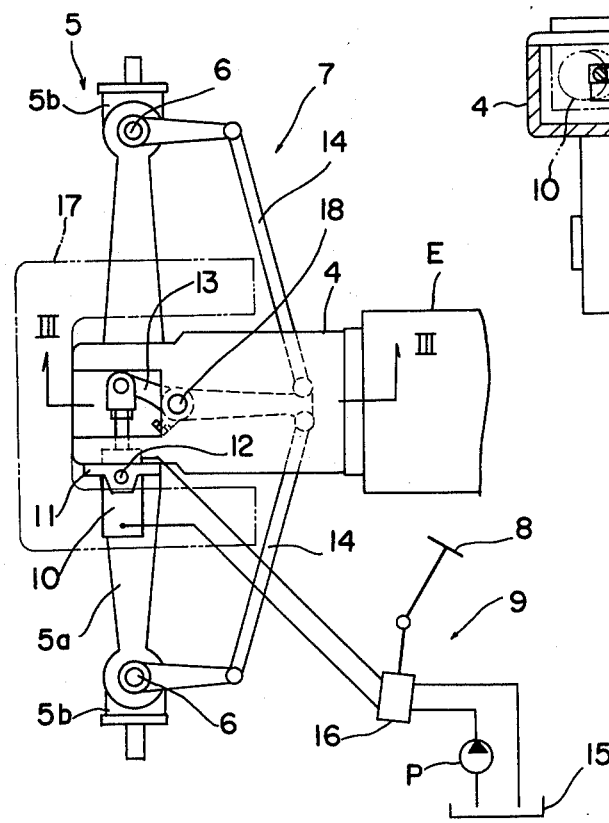
FIG. 2 is a plan view of main portions of the steering mechanism.
Figure 3:
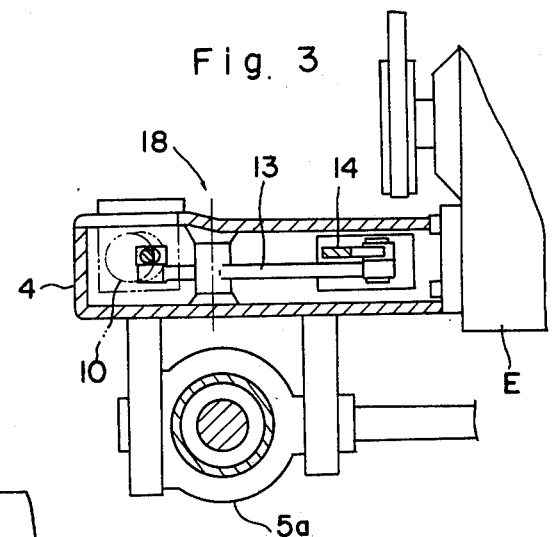
FIG. 3 is a sectional view taken along the line III—III in FIG. 2.

As shown in FIGS. 1, 2, and 3, in order to journal the front wheels 1 a frame 4 is connectingly secured to the front of an engine E, and an axle case 5 is supported by two brackets attached to the frame 4 in a rotatable manner about an axis extending longitudinally from the vehicle body. Such arrangement permits the front wheels 1 to be vertically swinging.

The frame 4 may be a casting and formed into a box-shape. Consideration is thus made for reducing the weight of the frame, simultaneously with providing the frame with necessary strength.

As shown in FIG. 2, the axle case 5 is constituted by portions 5a attached to the frame 4 and portions 5b attached to the front wheels 1 and also attached to the frame-side portions 5a in a manner swinging around vertical shafts 6, so that the respective front wheels 1 may be steered around the respective vertical shafts 6.

A power steering structure is constituted by a steering portion 7 for drivingly steering the front wheels 1 and an operating portion 9 for operating the steering portion 7 by rotating a steering wheel 8.

The steering portion 7 is arranged as discussed in the following.

As shown in FIGS. 2 and 3, a fluid pressure cylinder 10 is attached to a pair of brackets 11 secured to the box-shape frame 4, in a manner swinging around a vertical shaft 12. The cylinder 10 is interlocked with a tie rod 14 adapted to swing the axle case wheel-side portions 5b, by a swing means 13 which is attached to and disposed in the box-shape frame 4 in a manner swinging around a vertical shaft 18. The cylinder 10 is adapted to steer the front wheels 1. The covering function of the box-shape frame 4 may prevent the sticking of scattered mud to the swing means 13 and the pivotally connected portions thereof to the cylinder 10 and to the tie rod 14.

In attaching the cylinder 10 to the box-shape frame 4, the cylinder 10 is arranged such that its rod side only is located within the frame 4, thereby to reduce the size of the frame 4 while preventing a defective operation of the cylinder 10 which might be provoked by the sticking of mud to the cylinder 10.

The cylinder tube side of the cylinder 10 projecting from the box-shape frame 4 is covered by a front bumper 17 attached to the frame 4.

The operating portion 9 is arranged such that a fluid in a tank 15 is adapted to be supplied to the cylinder 10 from a pump P through a controller 16, and a return fluid from the cylinder 10 is adapted to be returned to the tank 15 through the controller 16, thus forming a fluid pressure circuit. The controller 16 is interlocked with the steering wheel 8. When the steering wheel 8 is rotated, the cylinder 10 is expanded and contracted to steer the front wheels 1 in the steering wheel rotating direction and by the steering wheel rotated amount.

Formed in the upper surface of the box-shape frame 4 is an opening through which it is possible to see the pivotally connected portion of the cylinder rod of the fluid pressure cylinder 10 to the swing means 13. The attachment, checking and maintenance of the swing means 13 may therefore be facilitated.

The tie rod 14 and the swing means 13 are arranged to substantially present the shape of a trident when taken in a plan view and when the wheels 1 are not steered. As compared with the arrangement in which the swing means 13 is disposed closer to one of the steering wheels 1, such a substantially trident-shaped arrangement may advantageously steer both steering wheels 1 by a substantially same amount, respectively, correspondingly to a swing operation of the swing means 13.

I claim:

1. A tractor steering mechanism, comprising
   (A) a frame in the shape of a box, secured to and extending forwardly from an engine,
   (B) a front axle case supported by said frame (A), which houses a pair of axles,
   (C) a pair of wheels, each wheel connected to a respective axle of said pair of axles (B),
   (D) a pair of tie rods, each tie rod engaged with a respective wheel of said pair of wheels (C) for steering said pair of wheels,
   (E) swing means having one end thereof pivotally connected to said tie rods (D), said swing means disposed within said frame (A) and oscillatingly attached to said frame (A) through a vertical axis, and
   (F) a hydraulic cylinder having a cylinder rod pivotally connected to the end of said swing means (E) opposite said tie rods (D), said hydraulic cylinder oscillatingly attached to said frame (A) through an additional vertical axis and having a rod projecting end thereof disposed within said frame (A).

2. The mechanism of claim 1 in which said frame (A) is a casting.

3. The mechanism of claim 2 in which an opening is formed in the upper surface of the frame, for viewing the portion of the cylinder rod (F) pivotally connected to the swing means (E).

4. The mechanism of claim 3 in which said swing means (E) and said tie rods (D) are substantially in the shape of a trident in plan view, when said wheels (C) are not turned.

* * * * *